June 13, 1939.  W. J. TELL  2,162,135
HOOD SUPPORT
Filed Sept. 28, 1938  2 Sheets-Sheet 1

Inventor
William J. Tell
By Blackmore, Spencer & Hint
Attorneys

June 13, 1939.   W. J. TELL   2,162,135
HOOD SUPPORT
Filed Sept. 28, 1938   2 Sheets-Sheet 2

Inventor
William J. Tell
By Blackmon, Spencer & Flint
Attorneys

Patented June 13, 1939

2,162,135

UNITED STATES PATENT OFFICE 2,162,135

HOOD SUPPORT

William J. Tell, Detroit, Mich., assignor to General Motors Corporation, Detroit, Mich., a corporation of Delaware Application September 28, 1938, Serial No. 232,191

9 Claims. (Cl. 217—60)

This invention relates to hood doors and has particular reference to a support for the door of the hood of automotive vehicles. The invention is particularly adapted to what is known as the alligator type of hood door in which the door is hinged at the rear end to the cowl and swings upwardly from the front of the vehicle.

The recent changes in the design of automotive vehicles has resulted in the use of the alligator type of hood door instead of the laterally opening hood doors having the side latch. One of the objectionable features of the alligator type hood is the excessive weight of the door and the upward distance it must be raised to allow inspection of the engine, and some inconvenience has been experienced in raising the door. The object of the present invention is to design and construct a mechanism which will aid in raising the hood door and at the same time act as a prop to retain the door in raised position. This object is accomplished by placing at the center of the vehicle a pair of links one of which is hinged to the cowl and the other hinged to the underside of the center of the hood. Coil springs are associated with this linkage and when the hood is in down position the springs are pulled apart or under tension and aid in holding the hood down. After the first small initial movement of raising the hood door, the springs are swung over center so that they act to straighten the links and therefore assist in raising the door.

On the drawings

Figure 1:
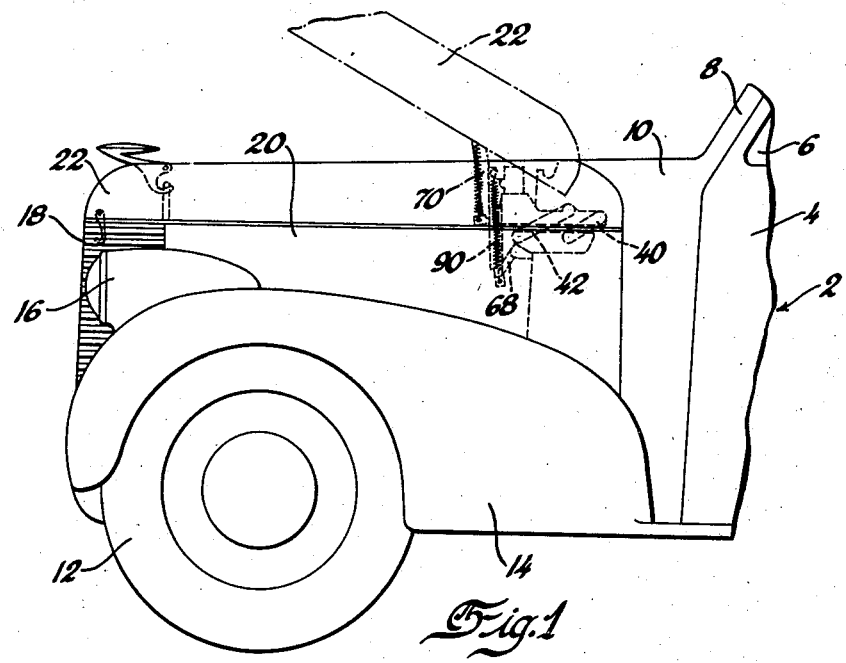
Figure 1 is a side view of the front end of an automotive vehicle showing the hood door in lowered position and in dotted line the raised position.
Figure 2:
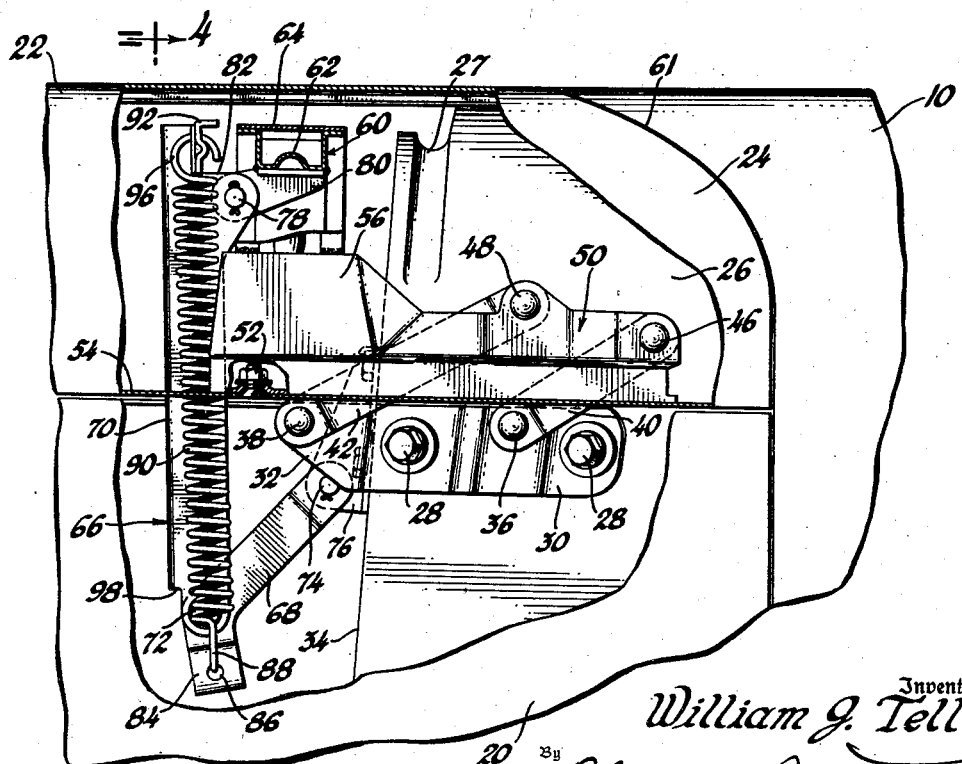
Figure 2 is an enlarged detailed side view of the hood hinge and linkage mechanism, the edge of the hood door and hood side being broken away better to illustrate the construction.
Figure 3:
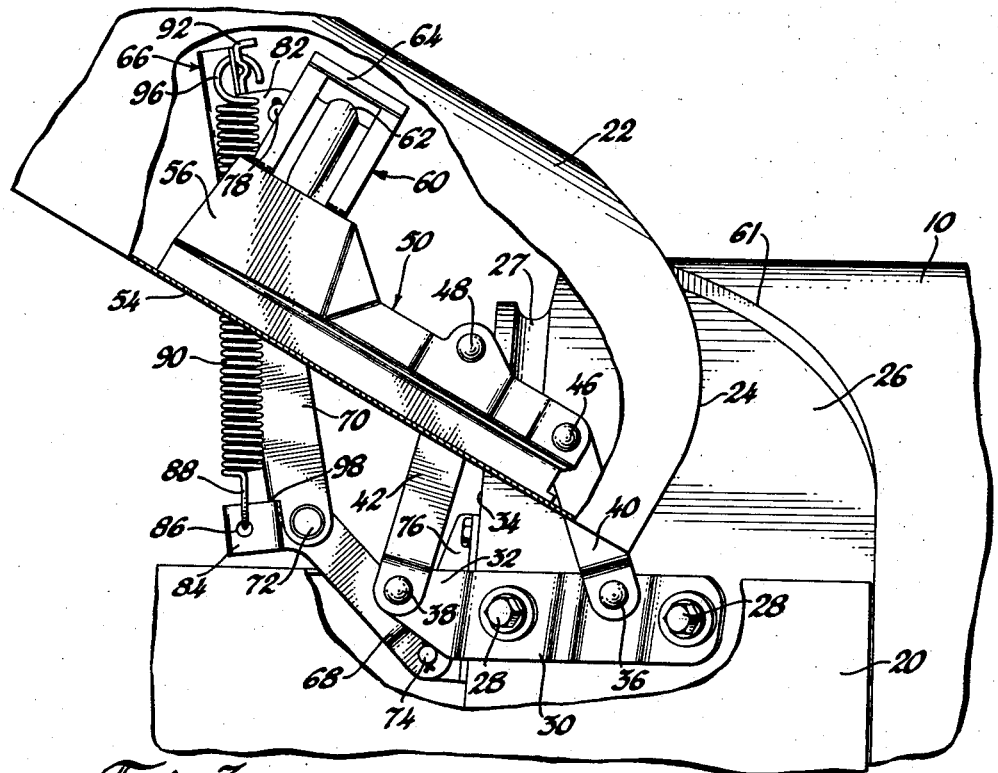
Figure 3 is an enlarged detailed view of the structure of Figure 2 but showing the hood door in raised position.

Referring to the drawings, the numeral 2 indicates the vehicle as a whole. The vehicle has the front door 4 having the window 6. The windshield is indicated at 8 and the cowl at 10. 12 indicates the front wheels of the vehicle, 14 the front fender, 16 the headlamp which is mounted on the fender 14, 18 the grille, 20 the hood side which is rigidly secured in place, and 22 the hood door which is hinged at its rear end adjacent the cowl 10. As is best shown in Figures 2 and 3, the rear end 24 of the hood door 22 overlaps the forward part 26 of the cowl, the part 26 having a water groove 27 to shed water to the side of the vehicle.

Figure 4:
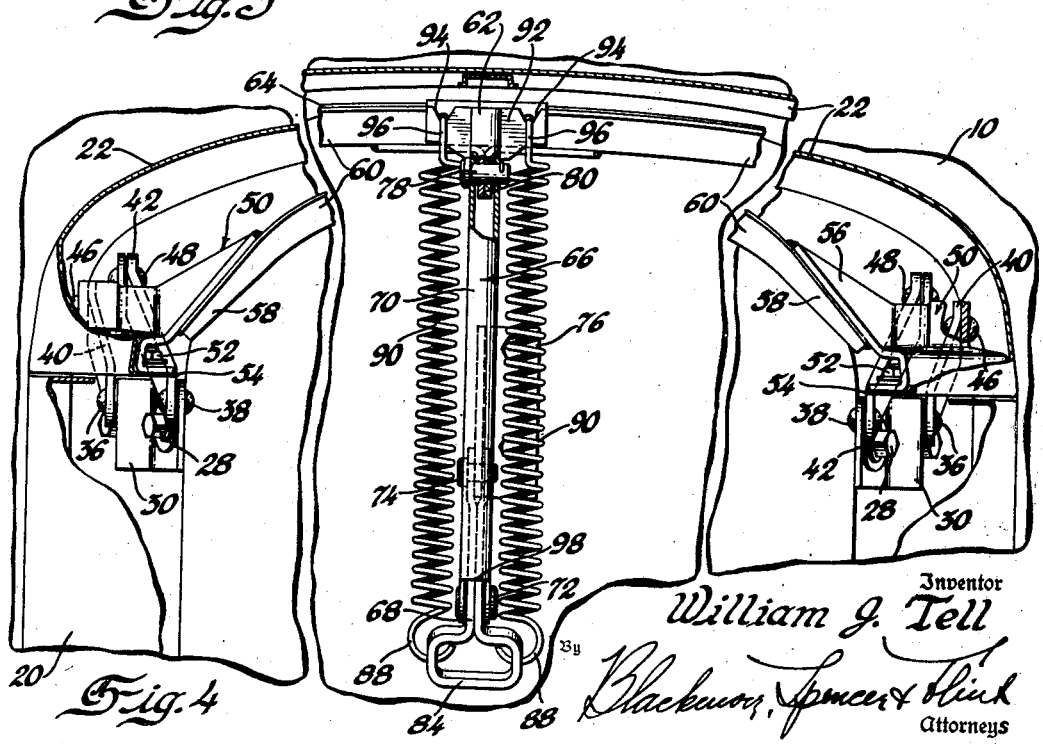
Figure 4 is the front view of the mechanism taken on the line 4—4 of Figure 2.

The hood part 26 has secured thereto by means of the bolts 28 the flat plate or the bracket 30, the forward part 32 of the plate extending out beyond the front edge 34 of the cowl. Pivot pins or bolts 36 and 38 are mounted on the bracket 30, the pivot 38 being at the extreme forward end of the bracket 30, and on the pivot bolts 36 and 38 there are mounted the rear short link 40 and the forward long link 42. The upper ends of the links 40 and 42 are secured to the pivot pins or bolts 46 and 48 which in turn are mounted on a bracket 50 secured by means of the bolts and nuts 52 to the inturned edge 54 of the hood door 22. The brackets 30 and 50 are stepped as is best shown in Figure 4 so that the links 40 and 42 do not move in the same vertical plane. The hood door 22 tapers from front to rear and the cowl side 26 is also tapered so that the brackets 30 and 50 are stepped or shaped to accommodate the taper.

The forward end of the bracket 50 is provided with an inwardly and upwardly extending part 56 to which there is secured the end 58 of a transverse arched brace member 60 extending from side to side of the vehicle, the arch 60 being to interbrace the two brackets 50 and to strengthen the rear of the hood door 22.

The hinge parts and brackets so far described, except the transverse brace 60, are duplicated at each side of the vehicle. The function of the longer and shorter links 42 and 40 is to cause the rear of the hood door to be swung forwardly as it is raised easily to move the adjacent edges of the hood and cowl along the line of junction 61 away from each other when the hood door is raised so that there will be no rubbing of metal or no wedging of one edge against the other.

By referring to Figure 2 it will be noted that the transverse brace 60 is channel shaped in cross section and has a rib 62 at the bottom of the channel. The top of the channel is closed by a plate 64 for the greater part of its distance and aids in strengthening and reinforcing the transverse arched brace 60.

The prop or support of the invention is indicated as a whole at 66 and comprises the lower link 68 and the upper link 70, these two links being interpivoted at 72. The lower link 68 is pivoted at 74 to a bracket 76 secured at the center part of the forward face of the cowl 10 while the upper end of the upper link 70 is pivoted at 78 to a bracket 80 secured to the arched brace 60 at the middle of the underside of the cowl door. The link 70 has an extension 82 which projects rearwardly and forms ears to receive the pivot bolt at 78.

The lower link 68 is formed of a strip of metal doubled upon itself and has its end where it is doubled over formed into a head 84 as is best shown in Figure 4 and each side of the head is provided with an opening 86 to receive the hooked ends 88 of the coil springs 90, there being one spring at each side of the link 66. The head 84, as will be best seen in Figures 2 and 3, extends some distance beyond the pivot 72 where the two links 68 and 70 are joined to each other.

The link 66 is U-shaped in cross section as will best be understood from Figure 4 and at its extreme upper end there is secured a transverse piece 92 the ends of which extend beyond the link and are provided with V-shaped notches 94 in which there are hooked the hooked upper ends 96 of the opposite end of the springs 90.

The position of the linkage mechanism 66 in the lowered or downward position of the hood is shown in Figures 2 and 4. When the operator desires to raise the hood, the latch (not shown) at the front end of the hood is released and the hood door raised. In the position of Figure 2 the line of action of the coil springs 90 is slightly over center and to the right (or rear of the vehicle) so that the springs 90 which are under compression or stretched will tend to hold the hood in down position. A slight initial movement will throw the lower point of application of force of the springs at 86 to the left when considering Figure 2, due to the raising of the link 68, and this throwing of the point of application of force at 86 to the left will cause the springs 90 to tend to straighten the links 70 and 68 because there will now be a pull between the points of application of force of the springs at 94 and 86 which tendency to straighten the links will aid in elevating the hood door so that after the initial application of force the springs 90 will aid the operator in raising the hood. This raising movement will continue until the head 84 of the lower link 68 strikes the shoulder 98 on the end of the lower link 70. This position of parts is shown in Figure 3 and is the fully raised position of the hood. In the position of the parts shown in Figure 3 they act as a support or prop to hold the hood door in raised position.

With the downward movement of the hood, due to the fact that the weight thereof and gravity are acting with the operator, there is no particular difficulty in lowering the hood. The lowering movement will cause the reverse movement of the links 68 and 70, i. e., from the position of Figure 3 to that of Figure 2, which cause the springs 90 again to be placed under tension and simultaneously to resist the lowering movement. When the hood door is in its fully lowered position as shown in Figure 2, the springs 90 will be stretched and under tension and will be thrown slightly over center with reference to the line joining the points of application of force 86 and 94 so that their action now is to tend to hold the hood door 22 in lowered position.

I claim:

1. In a support for the door of the hood of an automotive vehicle, a first link pivoted to the vehicle, a second link pivoted to the door, said links pivoted to each other, an extension on one link extending past the point where the two links are pivoted to each other, a plurality of springs, one end of the springs being secured to the second link where it is pivoted to the hood door, the other end of the springs being secured to the extension of the first link, said extension being out of alignment with the first link whereby the line of application of force of the springs when the hood is in lowered position is on one side of the interpivotal point of the two links and is on the other side of the said point when the hood door is slightly raised, whereby the springs tend to straighten the links when the hood door is raised to aid the raising of the hood door.

2. In a support for the door of the hood of an automotive vehicle, a first link pivoted to the vehicle, a second link pivoted to the door, said links pivoted to each other, an extension on one link extending past the point where the two links are pivoted to each other, a plurality of springs, one end of the springs being secured to the second link where it is pivoted to the hood door, the other end of the springs being secured to the extension of the first link, said extension being out of alignment with the first link whereby the line of application of force of the springs when the hood is in lowered position is on one side of the interpivotal point of the two links and is on the other side of the said point when the hood door is slightly raised, whereby the springs tend to straighten the links when the hood door is raised to aid the raising of the hood door, and means to limit the upward movement of the links to cause the links and springs to act as a prop to support the hood door in raised position.

3. In a support for the door of the hood of an automotive vehicle, a first link pivoted to the vehicle, a second link pivoted to the door, said links pivoted to each other, an extension on one link extending past the point where the two links are pivoted to each other, a plurality of springs, one end of the springs being secured to the second link where it is pivoted to the hood door, the other end of the springs being secured to the extension of the first link, said extension being out of alignment with the first link whereby the line of application of force of the springs when the hood is in lowered position is on one side of the interpivotal point of the two links and is on the other side of the said point when the hood door is slightly raised, whereby the springs tend to straighten the links when the hood door is raised to aid the raising of the hood door, and a shoulder on the second link, said head adapted to engage said shoulder to limit the upward movement of said links to cause said links and springs to act as a prop to hold the hood door in raised position.

4. In a support for the door of the hood of an automotive vehicle, a first link pivoted to the vehicle and extending forwardly and downwardly when the door is in lowered position, a second link pivoted at one end to the first link short of the end of said first link and at its other end to the underside of the hood door, said second link extending downwardly substantially vertically when the door is closed, two coil springs, one on each side of the second link, said springs being secured to the second link at their upper ends and to the extreme end of the first link at their lower ends beyond the pivotal point of the links to each other, said springs being under tension and in the lowered position of the hood having their line of action on the cowl side of the interpivotal point between the links to cause the action of the springs to tend further to collapse the links and hold the hood door in down position, and a slight raising of the hood door causing the line of action of the springs to move to the other side of the interpivot between the links to cause the spring action to tend to straighten the links and aid in raising the hood.

5. In a support for the door of the hood of an automotive vehicle, a first link pivoted to the vehicle and extending forwardly and downwardly when the door is in lowered position, a second link pivoted at one end to the first link short of the end of said first link and at its other end to the underside of the hood door, said second link extending downwardly substantially vertically when the door is closed, two coil springs, one on each side of the second link, said springs being secured to the second link at their upper ends and to the first link at their lower ends, said first link having its end beyond the interpivotal point with the first link out of alignment with the main part of the link, said springs being connected to the first link to said nonaligned end beyond the pivotal point of the links to each other, said springs being under tension and in the lowered position of the hood having their line of action on the cowl side of the interpivotal point between the links to cause the action of the springs to tend further to collapse the links and hold the hood door in down position, and a slight raising of the hood door causing the line of action of the springs to move to the other side of the interpivot between the links to cause the spring action to tend to straighten the links and aid in raising the hood.

6. In a support for the door of the hood of an automotive vehicle, a first link pivoted to the vehicle and extending forwardly and downwardly when the door is in lowered position, a second link pivoted at one end to the first link short of the end of said first link, and at its other end to the underside of the hood door, said second link extending downwardly substantially vertically when the door is closed, two coil springs, one on each side of the second link, said springs being secured to the second link at their upper ends and to the extreme end of the first link at their lower ends beyond the pivotal point of the links to each other, said springs being under tension and in the lowered position of the hood having their line of action on the cowl side of the interpivotal point between the links to cause the action of the springs to tend further to collapse the links and hold the hood door in down position, and a slight raising of the hood door causing the line of action of the springs to move to the other side of the interpivot between the links to cause the spring action to tilt to straighten the links and aid in raising the hood, and means to limit the raising movement of the links to cause the links and springs to act as a prop to hold the hood door in raised position.

7. In a hood support for the hood doors of automotive vehicles having a cowl, a bracket secured to the cowl, a first link pivoted to the bracket and extending forwardly and downwardly of the cowl in the lowered position of the hood door, a second link pivoted at one of its ends to the first link, a brace secured to the door, said second link pivoted at its other end to the brace, said first link having a head extending beyond the interpivotal point of the links, two springs under compression and secured at one end to the upper end of the second link and at their other ends to opposite sides of the head, said head being out of alignment with its link to cause the line of action of the springs to be on the cowl side of the interpivot between the links when the door is lowered, a slight raising of the hood door causing the line of action of the springs to shift to the other side of the interpivot to cause the action of the springs to tend to straighten the links whereby the action of the springs will aid in raising the door, and means to limit the movement of the links to cause the links to act as a prop when the door is fully raised.

8. In a hood support for the hood doors of automotive vehicles having a cowl, a bracket secured to the cowl, a first link pivoted to the bracket and extending forwardly and downwardly of the cowl in the lowered position of the hood door, a second link pivoted at one of its ends to the first link and at its other end to the hood door, said first link having a head extending beyond the interpivotal point of the links, two springs under compression and secured at one end to the upper end of the second link and at their other ends to opposite sides of the head, said head being out of alignment with its link to cause the line of action of the springs to be on the cowl side of the interpivot between the links when the door is lowered, a slight raising of the hood door causing the line of action of the springs to shift to the other side of the interpivot to cause the action of the springs to tend to straighten the links whereby the action of the springs will aid in raising the door.

9. In a hood support for the hood doors of automotive vehicles having a cowl, a bracket secured to the cowl, a first link pivoted to the bracket and extending forwardly and downwardly of the cowl in the lowered position of the hood door, a second link pivoted at one of its ends to the first link and at its other end to the hood door, said first link having a head extending beyond the interpivotal point of the links, two springs under compression and secured at one end to the upper end of the second link at opposite sides thereof and at their other ends to opposite sides of the head, said head being out of alignment with its link to cause the line of action of the springs to be on the cowl side of the interpivot between the links when the door is lowered, and constantly urging the door toward its lowered position, a slight raising of the door causing the line of action to shift to the other side of the interpivot to cause the action of the springs to tend to straighten the links when the hood door is slightly raised whereby the action of the springs will aid in raising the door, and means to limit the movement of the links and to prevent their reaching their fully aligned position to cause the links to act as a prop when the door is fully raised.

WILLIAM J. TELL.